US008233081B2

(12) United States Patent
Teppan et al.

(10) Patent No.: US 8,233,081 B2
(45) Date of Patent: Jul. 31, 2012

(54) PORTABLE VIDEO CONFERENCE CAMERA

(75) Inventors: Knut Helge Teppan, Asker (NO); Hallgrim Sagen, Oslo (NO); Bjørn Saunes, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 12/626,850

(22) Filed: Nov. 27, 2009

(65) Prior Publication Data

US 2010/0134635 A1 Jun. 3, 2010

(30) Foreign Application Priority Data

Dec. 1, 2008 (NO) .................................... 20085001

(51) Int. Cl.
*H04N 5/225* (2006.01)
(52) U.S. Cl. ..................................... 348/373; 348/207.1
(58) Field of Classification Search ............... 348/207.1, 348/373–375
See application file for complete search history.

(56) References Cited

U.S. PATENT DOCUMENTS

| 5,444,486 A | * | 8/1995 | Mizuno et al. ................. 348/376 |
| 6,738,094 B1 | * | 5/2004 | Minami et al. ................. 348/373 |
| D557,124 S | | 12/2007 | Martinez et al. |
| 7,413,151 B2 | * | 8/2008 | Wu ................................. 348/373 |
| 7,626,634 B2 | * | 12/2009 | Ohki et al. ..................... 348/373 |
| 2005/0265712 A1 | * | 12/2005 | Sitoh et al. ..................... 396/428 |
| 2007/0001071 A1 | * | 1/2007 | Yeh ............................. 248/179.1 |
| 2009/0015717 A1 | * | 1/2009 | Arnao et al. ................... 348/581 |

FOREIGN PATENT DOCUMENTS

| TW | 282690 B | 6/2007 |
| WO | WO 97/29317 A | 8/1997 |

* cited by examiner

*Primary Examiner* — Gevell Selby
(74) *Attorney, Agent, or Firm* — Oblon, Spivak, McClelland, Maier & Neustadt, L.L.P.

(57) ABSTRACT

An image capturing device includes a main body which has a tab that extends therefrom. The main body houses a video capturing unit, and a communication unit which transfers video images to an electronic apparatus. A hinge friction joint is connected to the main body, and a leg member is connected to the main body by the hinge friction joint. The hinge friction joint is configured to maintain a predetermined angle between the main body and the leg member that is greater than zero.

19 Claims, 9 Drawing Sheets

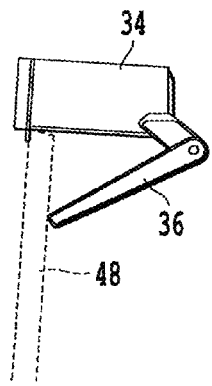 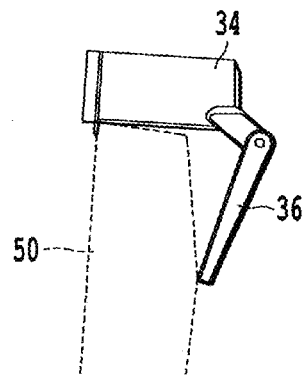 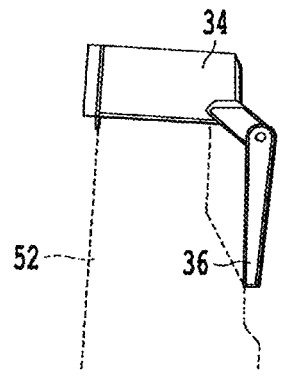
*Fig. 11A*  *Fig. 11B*  *Fig. 11C*
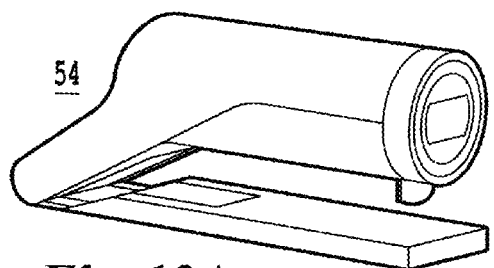
*Fig. 12A*
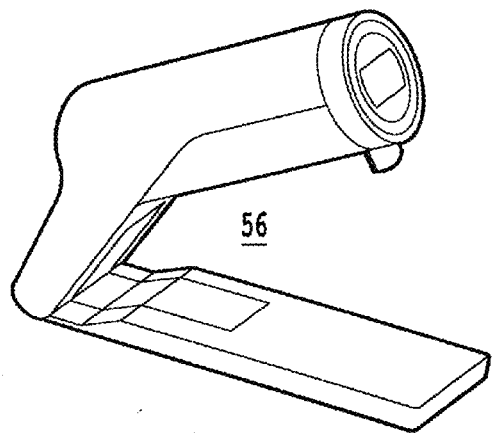
*Fig. 12B*
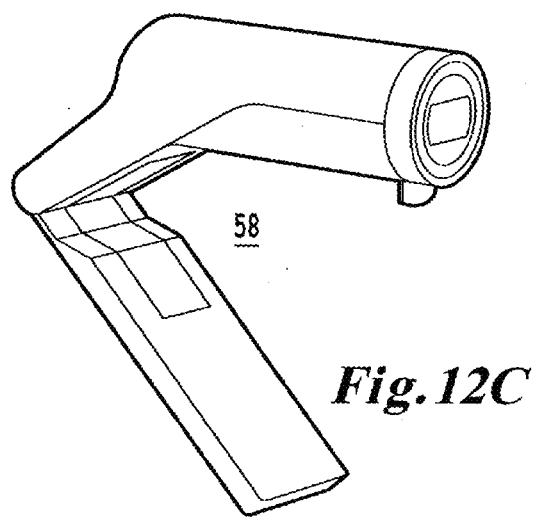
*Fig. 12C*

PORTABLE VIDEO CONFERENCE CAMERA

CROSS-REFERENCE TO RELATED APPLICATIONS

The present application claims priority under 35 U.S.C. §119 from Norwegian patent application No. 20085001, filed Dec. 1, 2008, the entire subject matter of which is incorporated herein by reference. The present application is also related to U.S. design application Ser. No. 29/334,481, filed Mar. 27, 2009, and Norwegian Design application No. 20080598, filed Nov. 3, 2008, which are herein incorporated by reference in their entirety.

BACKGROUND

1. Field of the Invention

The present disclosure relates to portable cameras suitable for videoconferences.

2. Description of the Related Art

Video conferences or person-to-person video calls are often made using standard personal computers or laptops with a flat screen or monitor. Although some screens and laptops have built-in cameras, stand alone cameras (i.e., web cameras) are common. There are various solutions for stands for these types of cameras. Some stands are made to allow a camera to be placed on a flat surface, such as on a desk surface, or to be mounted onto a screen.

U.S. Pat. No. D579,967 shows a web camera with a stand that can be folded for placement on a desk surface, and a stand that supports the camera when it is mounted on a screen.

U.S. Pat. No. D551,276 shows a camera stand where the camera is placed on top of an upper member.

U.S. Pat. No. 7,048,454 shows a three way video camera base and describes how the legs of the stand can be placed.

FIGS. 1 and 2 show conventional devices for supporting a camera. Such devices lack flexibility and stability. For example, a problem with these conventional devices is that the camera itself has a weight that makes the weight distribution uneven for the combined camera and stand. Furthermore, the camera legs 10 are often fragile and break easily, especially when the camera is transported. These cameras are typically connected to the computer with a cable, such as a cable using the Universal Serial Bus (USB) standard. If a camera is transported, the management of the cable becomes a problem. When the cable is wound up, it often comes loose, creates knots, and gets entangled with other cables. The cable may further get damaged when transported.

SUMMARY

An image capturing device includes a main body which has a tab that extends therefrom. The main body houses a video capturing unit, and a communication unit which transfers video images to an electronic apparatus. A hinge friction joint is connected to the main body, and a leg member is connected to the main body by the hinge friction joint. The hinge friction joint is configured to maintain a predetermined angle between the main body and the leg member that is greater than zero.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings:

FIGS. 11a-11c show an embodiment of the present disclosure fitted onto three different screens;

FIG. 12 shows an embodiment of the present disclosure closed, partly opened and placed on a desk surface, and open for being mounted on a screen;

DETAILED DESCRIPTION

Figure 1:
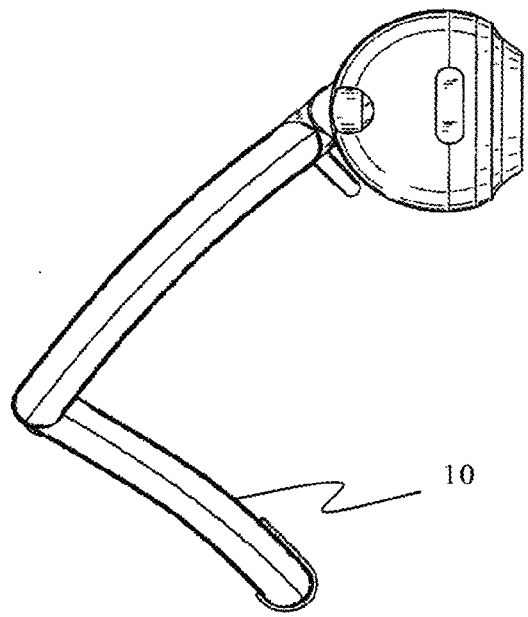
FIGS. 1 and 2 show conventional web cameras.
Figure 2:
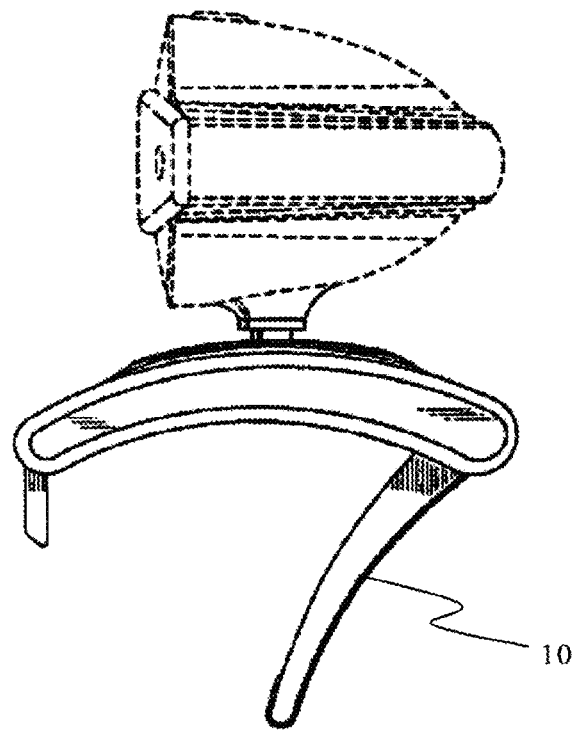
Figure 3:
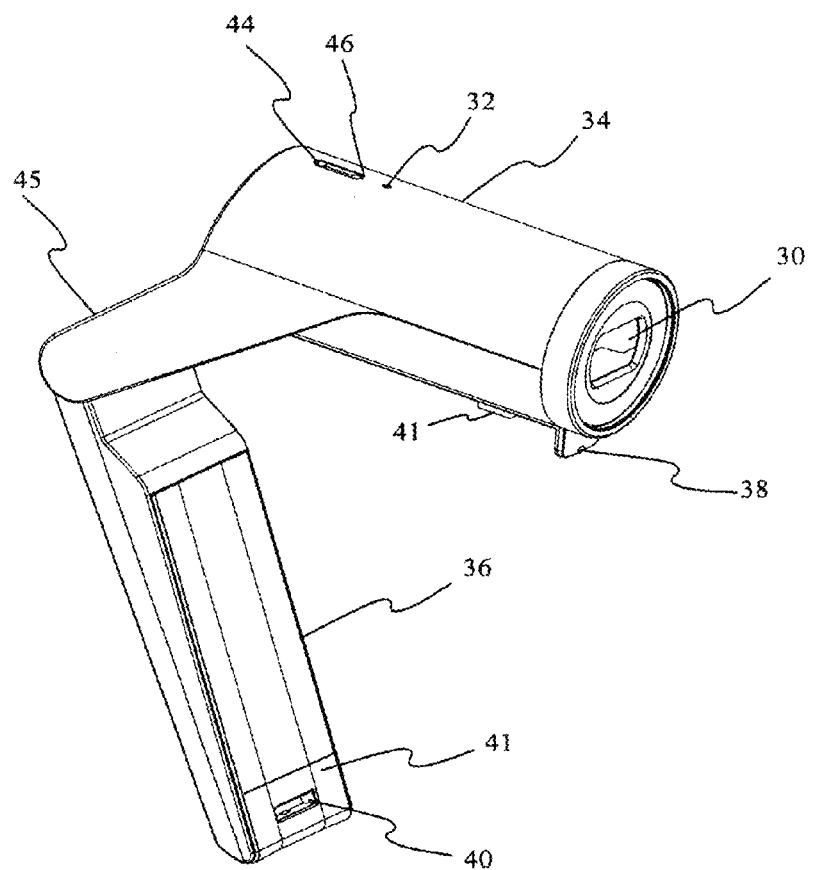
FIGS. 3 to 7 show an embodiment of the present disclosure in an open position.

An embodiment described herein is an image and sound capturing device suitable for video conferencing. The device may be portable and foldable, thereby enabling easy transportation and easy placement or hanging on flat screens or monitors, laptops, Personal Digital Assistants (PDAs), smartphones, any flat surface (i.e., a desk surface), or the like. The device may comprise two members, such as a main body or housing, 34 and a leg member 36 connected together, by a hinged friction joint, for example, as shown in FIG. 3. The device may further include high friction pads 41 on either the main body 34 or the leg member 36, or on both.

In an embodiment, the device may include or house, at least a video capturing unit and a communication unit for transferring video images to an electronic apparatus, such as, but not limited to, a computer or video conference endpoint. The device may be equipped with a camera supporting high definition video, which captures images. The device may include an Universal Serial Bus (USB) Video Class compatibility unit. Thus, the captured images may be processed in the camera and sent to a computer using an USB Video Class, which is a standard supported by many operative systems. Using this approach, a separate driver for different video cameras may not be needed. The camera may have a microphone 46, a frequency sensor 44 for detecting the frequency of indoor light in order to adjust the image frequency accordingly, a privacy shutter 30, and a Light Emitting Diode (LED) 32 indicating operation. The camera may be powered through a USB cable, using power from a computer or any other electronic apparatus with USB capabilities.

In an embodiment, both the main body 34 and the leg member 36 may be hollow. The main body 34 may comprise a video capturing unit (e.g., image sensor, lens, etc.) and the leg member 36 may include at least one electronic unit and an opening for a cable. The leg member 36 may also have an added weight containing or made up of a heavy material having a density near room temperature higher than 5 g·cm$^{-3}$, such as, but not limited to, zinc. A material of similar density may also be used for the main parts of the two members. For example, the main parts of the two members may be cast in metal alloy combined with plastics. The main body 34 and the leg member 36 may, for example, have substantially equal weight, such as, but not limited to, within +/−10%. Such a weight distribution may be used to provide stability to the device when placed both on a screen or on a desk surface. In addition, due to the weight distribution between the main body 34 and the leg member 36, the device may be more stable when placed on a desk surface, so as to stand alone without falling or tipping over, as shown in FIG. 12, position 56. Furthermore, the total weight of the camera and the low center of gravity may be chosen to provide stability when placed on a screen or a desk surface.

As mentioned above, the leg member 36 may support the main body 34 so as to stand on a flat surface, as shown in FIG. 12, position 56. Due to the aforementioned weight distribution, the leg member 36 may support the main body 34 on a flat surface when the angle between the leg member 36 and the main body 34 is greater than 0 degrees. Therefore, the device may stand alone in a stable state when the angle between the main body 34 and the leg member 36 is, for example, 20 degrees, 40 degrees, 60 degrees, 90 degrees, etc.

Figure 13:
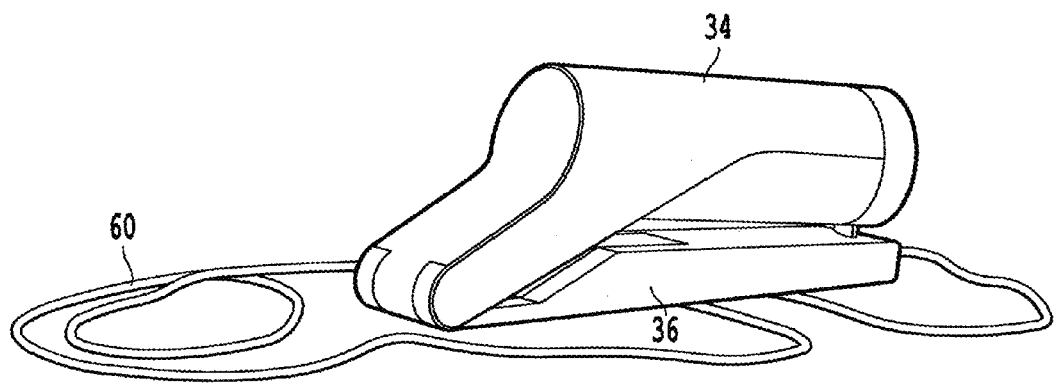
FIG. 13 shows an embodiment of the present disclosure folded with a cable.
Figure 14:
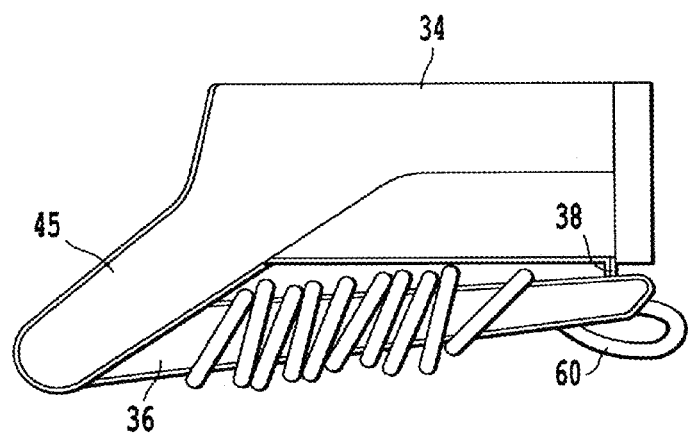
FIG. 14 shows an embodiment of the present disclosure with a cable fixed between two members.

In an embodiment, Printed Circuit Boards (PCBs) may be included in the leg member 36. Such an embodiment may provide more weight to the lower part of the camera which may increase stability of the camera when it is fitted or mounted onto a screen. Furthermore, a cable may exit from the leg member 36 of the camera, as shown in FIGS. 13 and 14. Such an arrangement may further increase the overall stability of the camera.

In an embodiment, the hinge friction joint 42 (shown in FIG. 5) may be connected to the main body 34. Specifically, the hinge friction joint 42 may be housed in an angled portion 45 (shown in FIG. 3) of the main body 34. The hinge friction joint 42 is a joint which permits motion in one plane, for example, up and down. Further, the hinge friction joint 42 frictionally fixes the elevation of the main body 34 so that the main body 34 stays in place at any position it is placed in, relative to the leg member 36. The hinge friction joint 42 may be configured to maintain a predetermined angle between the main body 34 and the leg member 36 which is greater than zero.

Thus, the hinge friction joint 42 may be adjusted through a range of movements, giving an infinite number of adjustable positions, at various predetermined angles. Some positions are shown in FIG. 12. The device may therefore be placed on any type of surface including angled or uneven surfaces, where conventional web cameras are unstable and fall over. This can be achieved by providing sufficient release within the friction joint, but many other ways are well known using friction or interlocking means. In one embodiment, the maximum opening between the main body and the leg member is less than 180 degrees.

The members, which include the main body 34 and the leg member 36, may be placed in various positions to accommodate screens of different size and/or thickness. The members may be so adjusted to a closed or partly closed position in order to place the camera on a desk surface. In the closed position, the lower member and the upper member interconnect so as to lock. Therefore, if the cable is wound around any of the members, it may be locked and thus prevented from unwinding. This allows the device to be easily transported without having the cable unwind, tangle, knot, or get damaged.

FIGS. 3 to 7 show an embodiment of the device in an open position, i.e., the main body 34 and the leg member 36 are folded out and away from each other. FIGS. 3 to 7 display the device in different views. The open position is typically used for hanging and fastening the camera on a screen.

FIG. 3 shows a tab 38 located at the front of the main body 34 which may hook on the edge of a screen (i.e., screen 48, screen 50, screen 52), as shown in FIG. 11. Both the main body 34 and the leg member 36 may have friction areas, for example, friction pads 41. These pads may be elastic contact pads of a polymer type, but may also be any type of material or surface providing high friction. In an embodiment, the leg member 36 may be connected to a rear end of the angled portion 45 of the main body 34, as shown in FIG. 3. Furthermore, FIG. 3 shows the device with the privacy shutter 30 activated, i.e., in a closed position.

The privacy shutter 30 or privacy cover is provided to serve as a lens protector and as a security feature. Conventional web cameras do not include a privacy shutter 30. Thus, if the conventional web camera remains plugged into the computer, even when not in use, computer hackers may be able to modify a user's computer settings allowing the hackers to receive images from the plugged-in web camera, without the user's knowledge or consent. Even if hackers were able to change a user's computer settings, the mechanical privacy shutter 30 of the camera may not allow hackers to deactivate the shutter by placing it in an open position.

Figure 4:
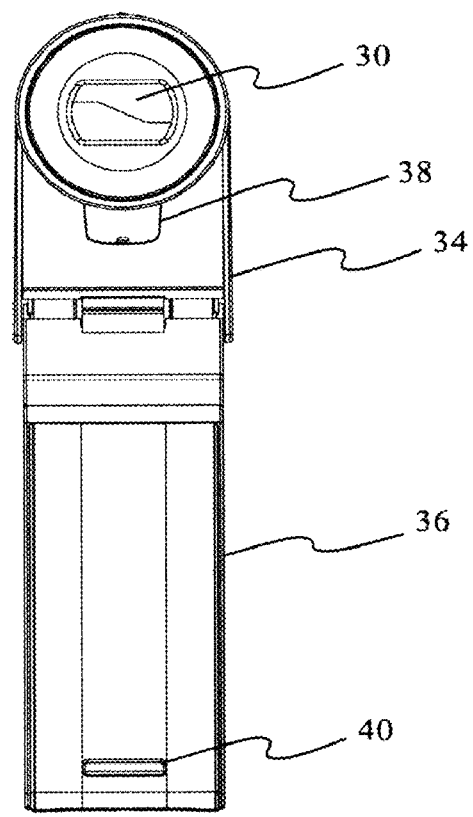

FIG. 4 shows a front view of the device, disclosing a cavity 40 in the lower leg member 36 which receives the tab 38, located on the main body 34, when the device is in a closed position. In an embodiment, when the device is in a closed position, the leg member 36 is parallel to the main body 34, shown in FIG. 12, position 54.

Figure 5:
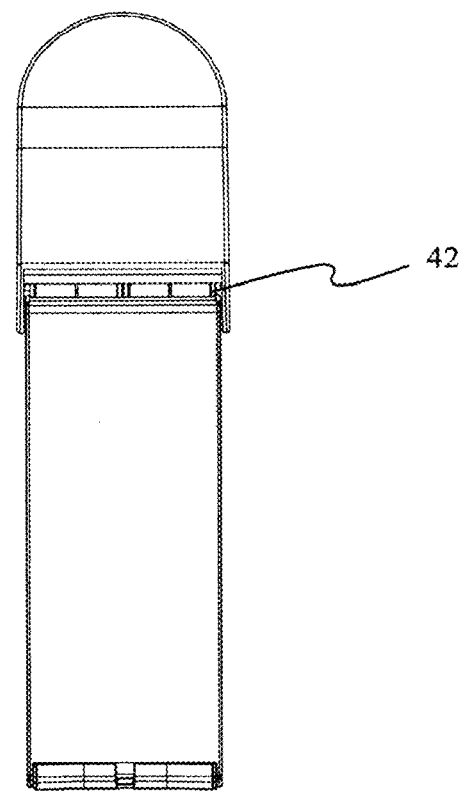

FIG. 5 shows the back of the device with some parts of the hinge friction joint 42 visible. In an embodiment, the device may contain only one hinge friction joint 42.

Figure 6:
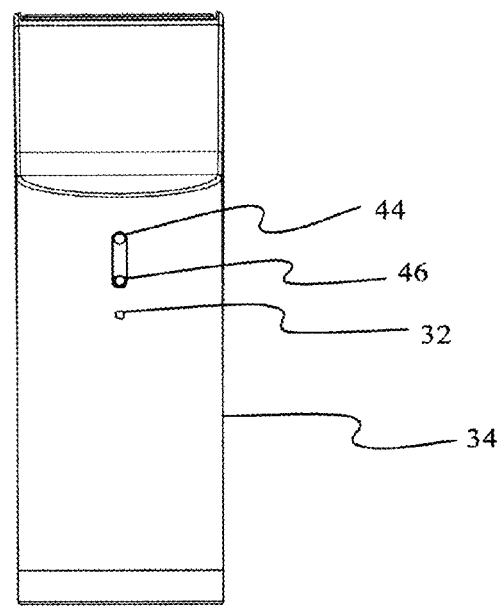

FIG. 6 shows a top view of the device. The top of the device may include a microphone 46, LED 32, and frequency sensor 44.

Figure 7:
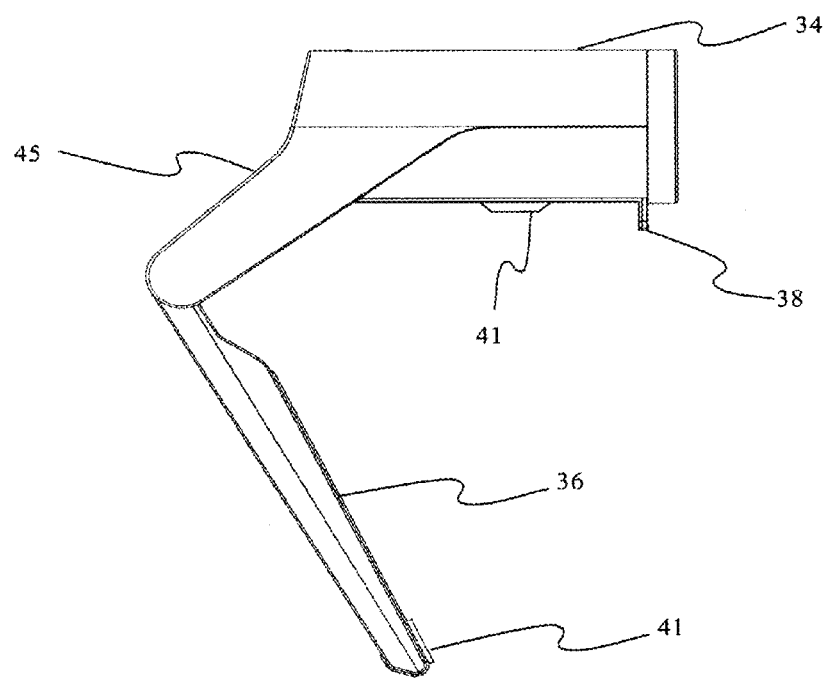

FIG. 7 is a side view of the device, further showing the tab 38 at the front of the main body 34 of the device.

Figure 8:
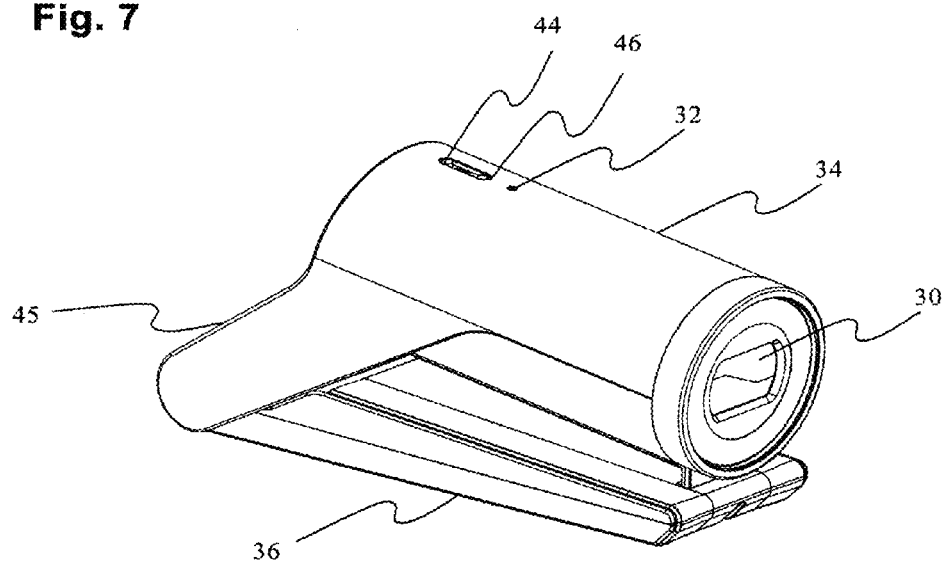
FIGS. 8 to 10 show an embodiment of the present disclosure in a closed position.

FIG. 8 shows the device in a closed position. The privacy shutter 30 in FIG. 8 is activated, and thereby closed. The privacy shutter 30 may also protect the lens, such as, but not limited to, when the device is being transported. The cavity 40, or opening, in the leg member 36 receives the tab 38 on the main body 34. In the closed position, the tab 38, the leg member 36, and the main body 34 create an enclosure with the cavity 40 such that a cable wound on either leg member 36 or main body 34 may be prevented from unwinding (see FIG. 14, discussed below).

Figure 9:
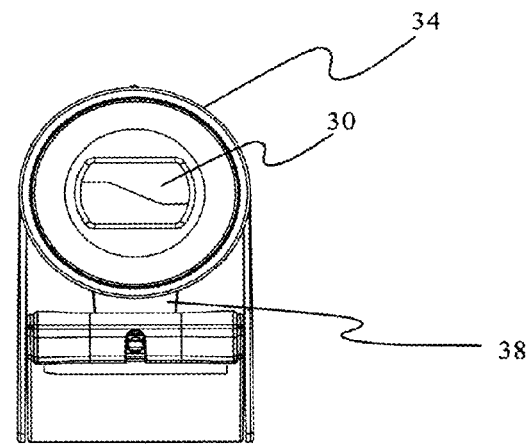
Figure 10:
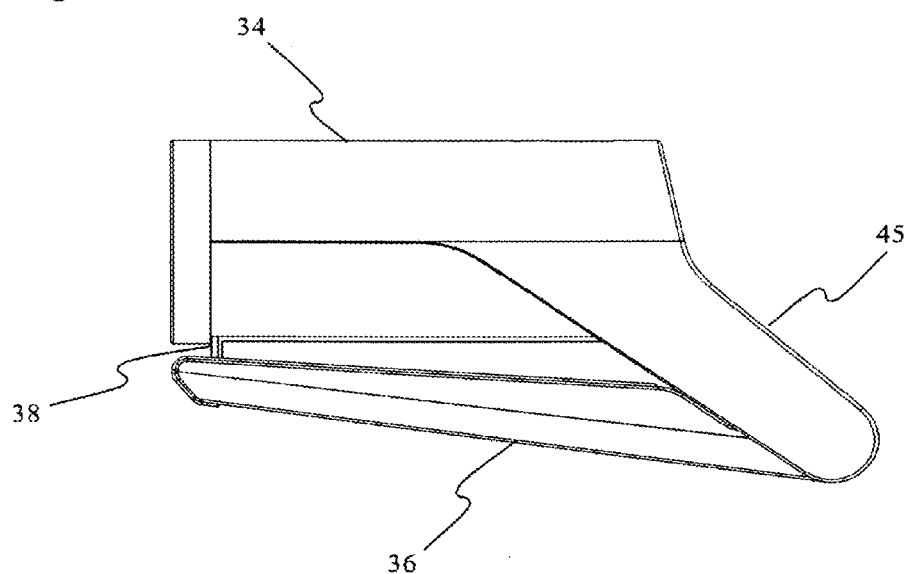

FIGS. 9 and 10 show a front view and a side view, respectively, of the device in a closed position.

FIGS. 11a-11c illustrate how the camera may be fitted or mounted on various screens. For example, FIG. 11a shows a 15-inch Apple Macbook Pro screen 48, FIG. 11b shows a larger 24-inch Dell® screen 50, and FIG. 11c shows a thicker 24-inch screen 52 from Acer®.

FIG. 12 shows the device in three different positions. The first position 54 is a closed position usable for placing the device on a flat desk surface or shelf without the need to hang it or mount it onto a screen. The second position 56 is a partly open position, which may be used when the device is placed on a desk surface and when the angle may need adjustment to capture the subject in focus. The third position 58 is the open position which may be used for fastening the device to a screen, or the like.

FIG. 13 shows a cable 60 of the device in a loose/unwound/unmanaged fashion. FIG. 14, on the other hand, shows how the main body 34 and the leg member 36 are interlocked and the cable 60 is wound around the leg member 36 and fastened. The cable 60 may be wound in many fashions, using both members, i.e., the main body 34 and the leg member 36, or fastened without winding the cable 60 around any member. The friction in the hinge keeps the members adjoined, enabling the cable 60 to stay in place. The tab 38 ensures that the opening between the main body 34 and the leg member 36 is closed by snapping into the leg member 36, thereby preventing the cable 60 from slipping out.

In an alternative embodiment the tab 38 may also include a locking mechanism. In another embodiment the cable 60 may protrude from the hinge between the two members. In yet another embodiment, the cable 60 may be a retractable cable, which may retract into the main body 34 or the leg member 36.

In another embodiment of the present disclosure, the cable 60 may be replaced by any known wireless technology. For example, an infra-red (IR) technology, IEEE 802.11 standards (such as, but not limited to 802.11a, 802.11b, 802.11g, 802.11n), or Bluetooth® technology may be employed, without departing from the spirit and scope of the present disclosure.

Further, it should be appreciated that the exemplary embodiments of the present disclosure are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the present disclosure, as set forth above are intended to be illustrative, not limiting. The various changes may be made without departing from the spirit and scope of the invention. Therefore, the disclosure is intended to embrace all now known or later-developed alternatives, modifications, variations and/or improvements.

The invention claimed is:

1. An image capturing device comprising:
   a main body including a tab that extends therefrom and that is configured to anchor the main body to a surface of a display, the main body housing a video capturing unit;
   a communication unit which transfers video images to an electronic apparatus;
   a hinge friction joint connected to the main body; and
   a leg member connected to the main body by the hinge friction joint, which is configured to maintain a predetermined angle between the main body and the leg member that is greater than zero.

2. The image capturing device according to claim 1, further comprising:
   a cable extending from the leg member,
   wherein the leg member has an opening configured to receive the tab on the main body when the leg member is in a closed position, and
   wherein the tab, the leg member, and the main body create an enclosure preventing the cable wound on the leg member from unwinding.

3. The image capturing device according to claim 1, wherein the main body further includes a privacy shutter for covering a lens of the device.

4. The image capturing device according to claim 1, further comprising an Universal Serial Bus Video Class compatibility unit.

5. The image capturing device according to claim 1, wherein at least one of the main body, the tab, and the leg member contain a material with a density near room temperature higher than 5 g·cm$^{-3}$.

6. The image capturing device according to claim 1, further comprising:
   a cable protruding from an end of the leg member, the leg member having a wired connection to the main body through the hinge friction joint,
   wherein the leg member has a cavity for holding an electronic unit.

7. The image capturing device according to claim 1, wherein a weight of the main body is substantially equal to a weight of the leg member.

8. The image capturing device according to claim 1, wherein the leg member is configured to support the main body in a position where the angle between the leg member and the main body is greater than zero degrees when the leg member is on a flat surface.

9. The image capturing device according to claim 1, wherein the video capturing unit is a high definition video camera.

10. The image capturing device according to claim 1, wherein the image capturing device includes only one hinge friction joint.

11. The image capturing device according to claim 1, wherein at least one of the main body and the leg member includes a friction pad.

12. The image capturing device according to claim 1, wherein the leg member is parallel to the main body when the image capturing device is in a closed position.

13. The image capturing device according to claim 1, wherein the leg member includes at least one electronic unit.

14. The image capturing device according to claim 1, wherein the main body is configured to move via the hinge friction joint in only a single plane.

15. The image capturing device according to claim 1, wherein
   the tab of the main body is configured to anchor the main body to a top surface of the display, and
   the leg member is configured to support the main body by interacting with a back surface of the display.

16. The image capturing device according to claim 1, wherein the main body and the tab have no freedom of rotation with respect to each other.

17. An image capturing device comprising:
   a main body including a tab that extends therefrom and that is configured to anchor the main body to a surface of a display, the main body housing a video capturing unit;
   a communication unit which transfers video images to an electronic apparatus;
   a hinge friction joint connected to the main body; and
   a leg member including a cavity, the leg member connected to the main body by the hinge friction joint, wherein the cavity is configured to receive the tab.

18. The image capturing device according to claim 17, wherein the cavity and the tab are configured to lock the main body and the leg member together.

19. An image capturing device comprising:
   a main body including a tab that extends therefrom and that is configured to anchor the main body to a surface of a display, the main body housing a means for capturing video images;
   a means for transferring the video images to an electronic apparatus;
   a leg member including a cavity, the cavity being configured to receive the tab; and
   a means for connecting the leg member to the main body, wherein the means for connecting is configured to maintain a predetermined angle between the main body and the leg member that is greater than zero.

* * * * *